April 16, 1935.   C. DOERING   1,998,000
PORTABLE BEER DISPENSER
Filed Sept. 20, 1933   3 Sheets-Sheet 2
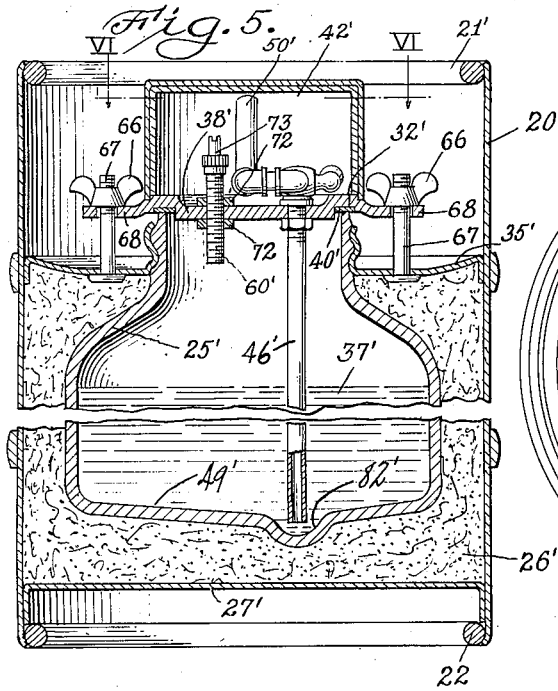
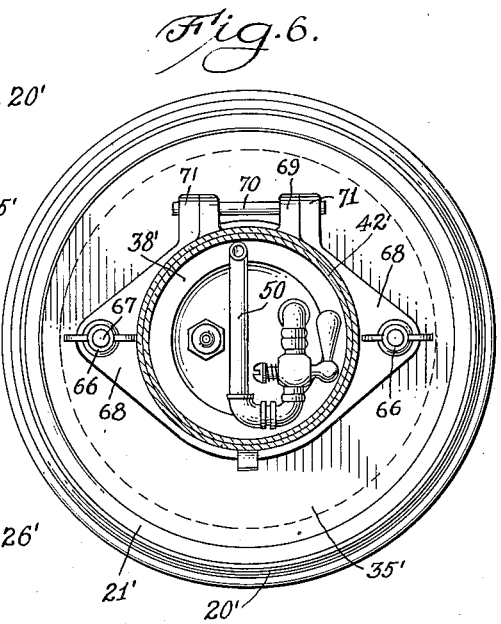
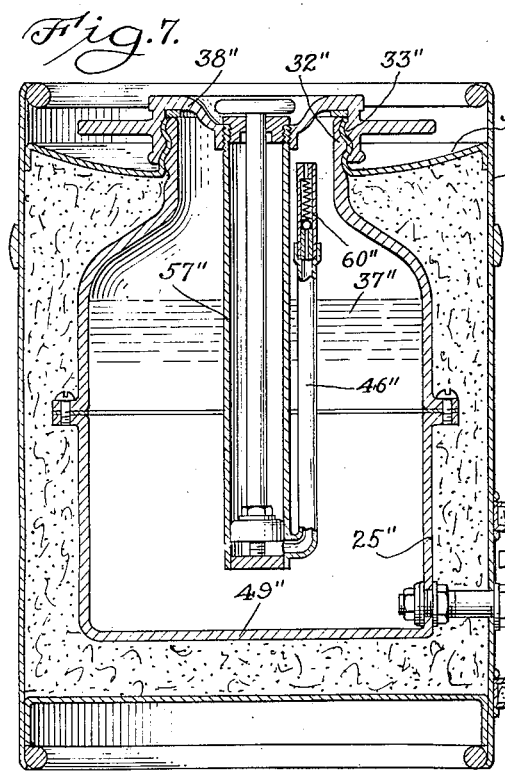
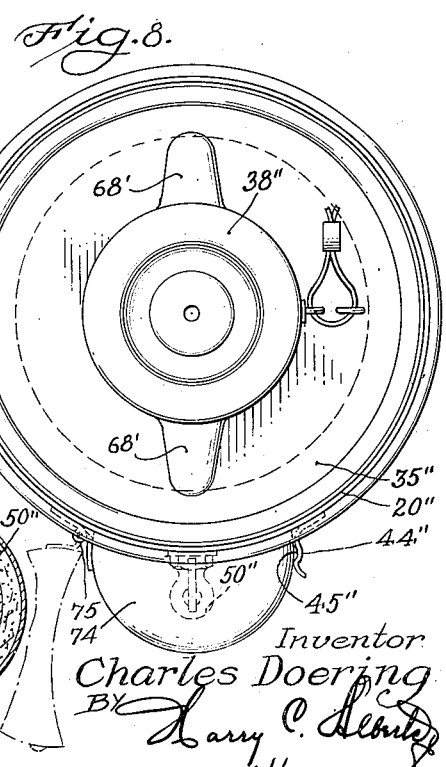
Inventor
Charles Doering
BY Larry C. Alberts
Attorney

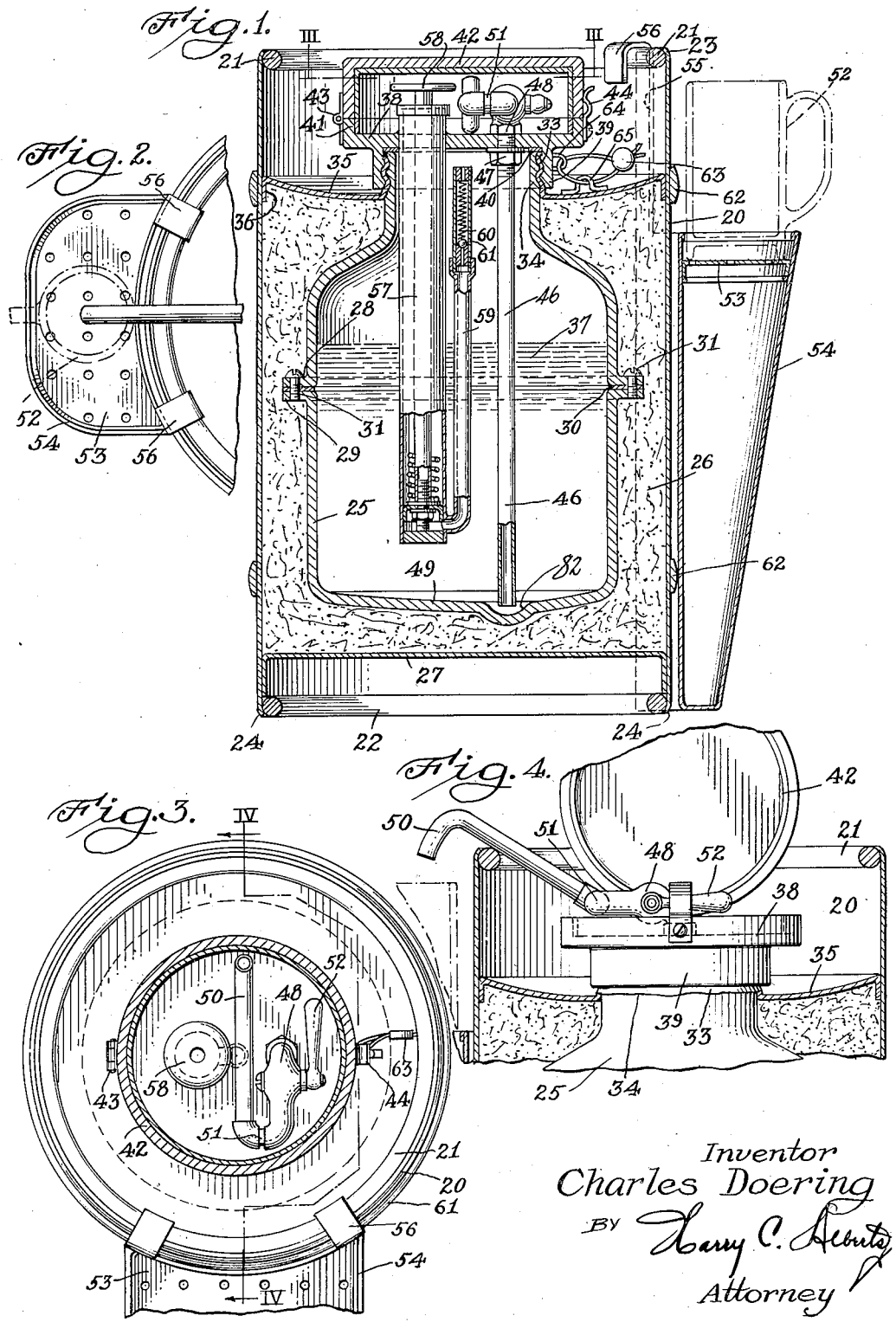

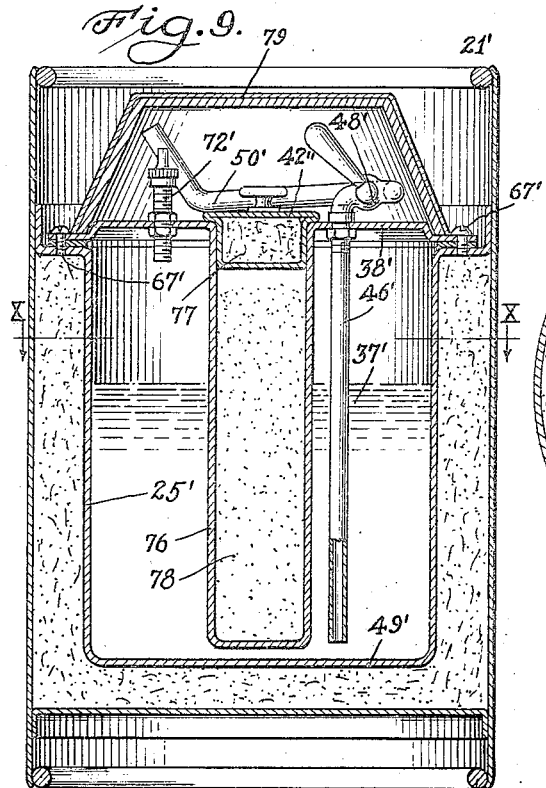
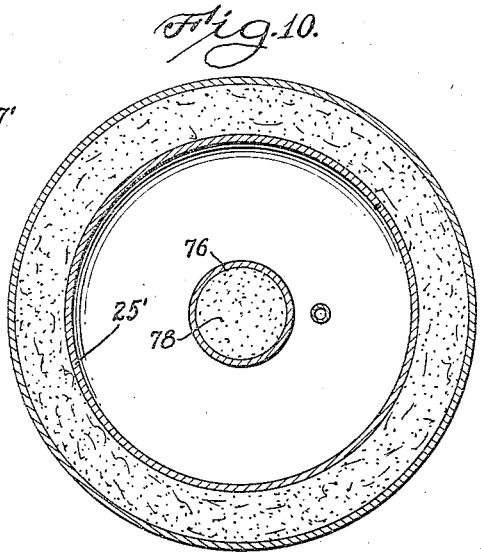
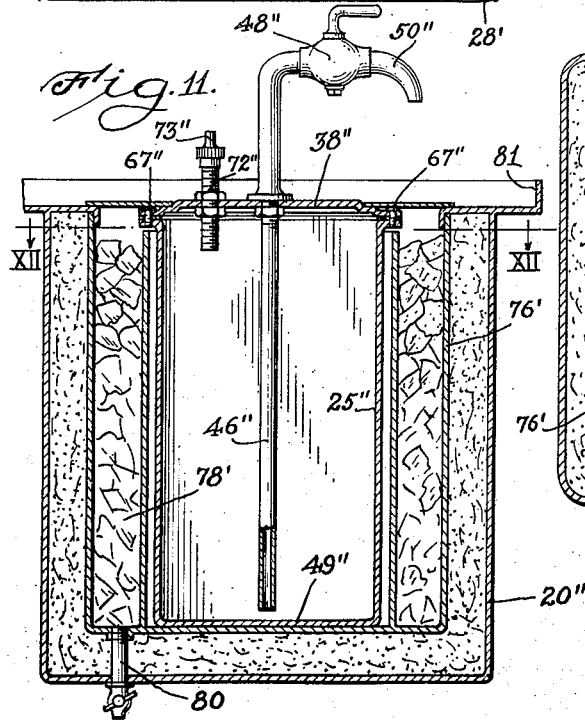
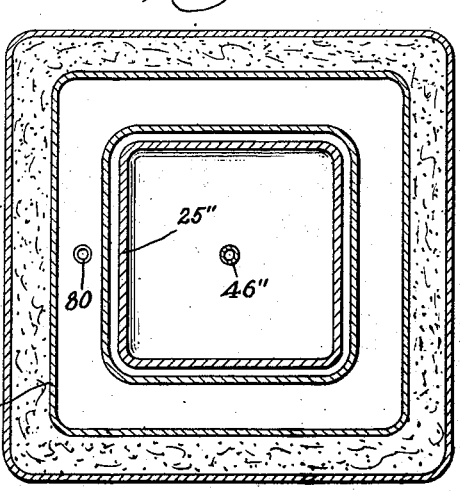

Patented Apr. 16, 1935

1,998,000

UNITED STATES PATENT OFFICE 1,998,000

PORTABLE BEER DISPENSER

Charles Doering, Chicago, Ill.

Application September 20, 1933, Serial No. 690,191

9 Claims. (Cl. 225—16)

This invention relates to containers and more particularly to portable liquid dispensers, although certain features thereof may be employed with equal advantage for other purposes.

It contemplates more especially the provision of a simple and improved portable device for dispensing the liquids under pressure directly to the trade in a refrigerated or cooled state.

Numerous types of liquid dispensers have heretofore been proposed, but these are not suitable or entirely satisfactory for confining, transporting and dispensing such liquids as beer directly from the counter. It is necessary or at least highly desirable that liquids such as beer and kindred drinks be dispensed in a cool state under pressure in order to render such salable as a refreshing drink.

Moreover, devices of this character not only must enable dispensing of liquids under pressure, but must retain these in a cool state and afford the transportation thereof preliminary to being dispensed over the counter for direct sale to the consumer without requiring a change of container or entailing any further handling expense. To this end it is highly desirable to provide a container that is thermetically efficient and of such compactness as to afford the convenient transportation thereof with the necessary equipment for unit dispensing directly from the counter. Compactness is of importance and all operating dispensing parts must be sufficiently concealed so as to avoid interference during the handling thereof preparatory to placement on a counter for direct dispensation of the confined liquids.

One object of the present invention is to simplify the construction and improve the operation of devices of the character mentioned.

Another object is the provision of an efficient and novel container with liquid dispensing means to maintain the liquid at a refreshing temperature during summer heat for selective dispensing of the contents.

A further object is the provision of novel means for maintaining the liquids in the container under pressure and to result in the improved controlled discharge thereof in a refreshing state.

Still a further object is the provision of novel means for collapsing and confining the dispensing device to facilitate the handling thereof for transportation purposes with minimum inconvenience thereafter.

A still further object is the provision of novel pressure means in conjunction with collapsible discharge means so as to provide a thermally protected, compact and efficient container and dispenser combined in a self-contained unitary structure.

Other objects and advantages will appear from the following description of an illustrative embodiment of the present invention.

In the drawings:

Figure 1 is a sectional view in elevation of a device embodying features of the present invention.

Figure 2 is an enlarged fragmentary plan view of the glass support and drain.

Figure 3 is a sectional view taken substantially along line III—III of Figure 1.

Figure 4 is a fragmentary sectional view taken substantially along line IV—IV of Figure 3, with the discharge faucet in an operative position.

Figure 5 is a sectional view in elevation of a modified embodiment of the present invention.

Figure 6 is a sectional view taken substantially along line VI—VI of Figure 5.

Figure 7 is a sectional view in elevation of a still further modified embodiment of the present invention.

Figure 8 is a plan view of the device shown in Figure 7.

Figure 9 is a sectional view in elevation of a still further modified embodiment of the invention.

Figure 10 is a sectional view taken substantially along line X—X of Figure 9.

Figure 11 is a sectional view in elevation of a still further modified embodiment of the present invention.

Figure 12 is a sectional view taken substantially along the line XII—XII of Figure 11.

The structure selected for illustration comprises a substantially cylindrical shell 20 which is provided with reinforcing circular ring members 21 and 22 adhesively joined to the periphery of the open ends 23 and 24 thereof. A liquid confining container 25 is disposed within the shell 20 which is of larger diameter so as to define an enveloping space for the reception of insulation material such as a cork packing 26 which is supported upon a dished member 27 serving as a bottom for the shell 20. As shown, the dished member 27 has peripheral flanges thereof disposed downwardly so as to adhesively engage the walls of the shell 20 to provide an inwardly extended bottom serving as a support for the insulation 26 which in turn supports and maintains the container 25 in its position concentric with the shell 20.

The container 25 may be of sectional construction to present transverse sections joined through the medium of adjacent peripheral flanges 28 and 29 which are provided with a gasket 30 therebetween to effect hermetically sealed interengagement through the fastening expedients of a plurality of circumferentially spaced studs 31. The mouth 32 of the container 25 is preferably of reduced cross section and terminates in a threaded neck 33 which enables the attachment of a correspondingly threaded sleeve 34 constituting a part of the plate 35 which has a peripheral flange 36 corresponding in dimensional extent with the interior of the seal 20 so as to afford the joinder thereto by resort to welding or other expedients to accomplish a similar purpose. The plate 35 is preferably of concave configuration and serves to retain the packing insulation 26 against removal from the interior of the shell 20 so as to thermally insulate the container 25 throughout the wall area thereof except for the mouth or neck region 33.

The wall of the container 25 is preferably tarred or otherwise coated to enable the confinement of liquids such as beer 37 without any chemical or other taste influence thereon. The container 25 is provided with a closure 38 which has a depending flange 39 provided with threads for engagement with the exterior of the correspondingly formed or shaped sleeve 34, there being a gasket or washer 40 provided on the peripheral edge of the container mouth 33 to afford a hermetically sealed joinder therewith. The closure 38 has an upstanding peripheral wall 41 which serves as a complement to a closure top 42 which is hinged thereto as at 43 so as to provide access to the closure plate 38. Any suitable fastening expedient such as a spring detent 44 intended for cooperation with a nib 45 to retain the closure 38 with its top 42 in a closed position enables the concealment of its instrumentalities therein in a manner which will appear more fully hereafter.

In order to enable dispensing of the beer or other liquid 37 from the container 35, a tube 46 is mounted to the closure 38 by means of an engaging nut 47 disposed on one side of the closure 38 and a valve body 48 in threaded engagement therewith on the other side thereof, these being spaced to engage the closure plate 38 therebetween so that the tube 46 will extend downwardly to very nearly contact the bottom 49 of the container 25. An extended faucet 50 is pivotally connected to the valve body 48 through the medium of a nipple 51 so as to overhang the top ring member 21 of the shell 20 in its operative position (Figure 4) or to be completely confined within the closure 38 and its top 42 when collapsed to its inoperative position (Figures 1 and 3).

A valve 52 cooperates with the valve body 48 so as to control the discharge of the liquid through the faucet 50 which extends over and beyond the shell reinforcing member 21 so as to enable the discharge of the container contents to a receptacle such as a glass 52 supported on an apertured plate 53 constituting a part of a drain receptacle 54 detachably associated with the shell 20. To this end, the drain receptacle 51 is supported by means of vertically extending straps 55 which terminate in hooked extensions 56 to engage the top ring member 34 so as to suspend the drain receptacle 54 therefrom in an operative position. In order to effect the discharge of the liquid and to effect the confinement thereof under pressure, a pump housing 57 is supported by the closure plate 38 so as to depend downwardly therefrom into the container 25, it being hermetically joined to the plate 38 so that a small portion of the housing 57 will extend exteriorly within the confines of the closure top 42. A hand manipulated piston 58 is reciprocally mounted in the pump housing 57 which has a discharge tube 59 in communication therewith to support an air valve 60. The air valve 60 automatically permits the discharge of air from the pump housing 57, but through its spring impelled valve 61, precludes the entrance of liquid or air to the interior of the tube 59 in communication with the pump housing 57.

Consequently, the liquid such as beer 37 may be maintained under any desired air pressure and discharge thereof through the faucet 50 effected in consequence thereof. This maintains the liquid 37 under pressure to preclude the escape of desired gases therein and to effect the discharge thereof and avoid a flat taste which is undesirable in liquids such as beer. The insulation 26 retains the liquid 37 at its originally charged temperature for a period in excess of twenty-four hours, and the shells 20 enable the transportation of the liquid and convenient handling thereof for placement on a counter to effect the direct dispensing into receptacles such as glasses 52 for immediate consumption.

The collapsible arrangement of the faucet 50 together with the closure top 42 serving as a protective medium, provides a compact and readily convertible unit for use as a dispenser. With the ends of the shell 20 protected by rings 21 and 22, and the tops and bottom serving as the confining medium for the insulation 26 being disposed within the confines of the shell 20, complete protection is afforded so that the container 25 may be handled for transportation and placement without destruction or requiring the removal of the liquid 37 other than for direct dispensing. Reinforcing bands or ring members 62, in this instance two, serve to reinforce the shell 20, and imparts the desired rigidity and strength to the assembled unit. Any suitable form of seal 63 may be utilized to preclude tampering with the closure 38 so as to insure against refilling from an unauthorized source, these extending through closed loops 64 and 65 attached to the closure 38 and the top insulating confining plate 32, respectively.

In the modified embodiment disclosed in Figure 5, the shell 20' is reinforced with circular ring members 21' and 22' and the insulation 26' confines the container 25' which may be of sectional or integral construction as commercial practice may dictate or find most satisfactory for that purpose. The bottom and top plates 27' and 35' are disposed within the confines of the shell 20', and these serve to confine the insulation 26' so as to maintain the container 25 in proper position insulated on all sides except the mouth 32'. The closure plate 38' covers the open mouth 32' of the container 35', and a gasket 40' serves as a hermetic seal therebetween responsive to the pressure application effected by means of winged nuts 66 in threaded engagement with studs 67 mounted to the top insulation cover plate 35' to extend through apertures provided diametrical extending flanges 68 constituting a part of the closure plate 38'.

Any suitable type of closure cover 42' may be applied to conceal the faucet 50' which is collapsible in the manner described in connection with Figure 1. A closure 42' is preferably provided with lugs 69 which extend through a pintle 70 mounted on lugs 71 integrally or otherwise joined to the closure plate 38'. In this particular embodiment, the air valve 60' is mounted on the closure plate 38', it being exteriorly threaded to receive nuts 72 on both sides of the closure plate 38'. A valve cap 73 is detachably connected with a valve 60' so as to enable the attachment of a hand pump thereto as conditions may require or during the use thereof to maintain the liquid 37' under pressure or to assist in the dispensing thereof.

In a still further modified embodiment disclosed in Figures 7 and 8 the closure plate 38" is in threaded engagement with the open mouth 32' through the medium of the threaded neck 33" of the top plate member 35" in a manner very similar to that described and disclosed in connection with Figure 1. Extensions 68' on the closure plate 38" enable the rotary manipulation thereof to effect the attachment and detachment for refilling purposes. In this embodiment, the hand pump 57" is mounted axially in connection with the closure plate 38', and the valve 60" is supported and connected to a tube 46" as described supra. Discharge is effected through a faucet 50" connected to the shell 20" and the container 25" near the bottom 49" thereof so as to enable the gravity discharge of the liquid 37" and emptying of the container 25".

An insulated cap 74 is hinged as at 75 to enclose the faucet 50" and to preclude undue thermal transmission therebetween, there being a resilient fastener 44" mounted on the shell 20" for cooperation with a lug 45" to hold the faucet housing 74 in closed position against accidental removal. With the aid of the hand manipulated pump 57" the liquid such as beer 37" may be held under pressure for discharge through the faucet 50" which serves as a supplement to the gravity flow therethrough so as to render the liquid available under pressure to retain its refreshing effect upon the taste during the consumption thereof.

In the modification disclosed in Figures 9 and 10, provision is made for refrigeration so as to actually cool the liquid 37'. This is effected by means of a well 76 constituting a part of the closure plate 38' which is fastened to the container 25' by means of threaded studs 67'. The well 76 is formed for axial extension from the plate 38' so as to depend within the container 25' to closely approach the bottom 49'. A closure 42' is in telescopic engagement with the well 76', it being provided with insulation 77 so as to preclude excessive thermal communication between the exterior of the closure plate 38' and the interior of the refrigeration well 76. Any suitable refrigerant such as dry ice or ice 78 may be provided within the well 76 so as to have a cooling influence upon the liquid 37'. With this arrangement, the air valve 72' is mounted in the closure plate 38' laterally of the well 76' while the faucet 50' and its depending tube 46' is mounted to the plate 38' on the other side in diametrical alignment with the valve 72'. Any suitable cover 79 may be utilized to conceal the collapsed faucet 50' together with the air valve 72' and the refrigeration well 76 which are all within the confines of the reinforcing ring members 21' and 22'.

In the embodiment illustrated in Figures 11 and 12, the refrigerant well 76' surrounds the container 25" which has a closure plate 38" secured thereto by means of studs 67". An air valve 72" with its cap 73" is fixed to the closure plate 38". A faucet 50" with its valve body 48" communicates with the pipe 46" which is secured to the closure plate 38" to depend therefrom within the container 25" to closely approach the bottom 49" thereof. A drain tube 80 extends through the shell 20" to communicate with the refrigerant well 76' to drain the water that may result from the refrigerant such as ice 78'. The shell 20 terminates upwardly in an enlarged peripheral upstanding flange 81 which enables the support of receptacles thereon for receiving the liquids through the faucet 50" responsive to the pressure created in the container 25" through a pump that is detachably connected with the air valve 72".

So that liquid confining containers or receptacles 25 or 25' may be completely emptied by resort to the dispensing apparatus described supra, the bottoms 49 and/or 49' thereof (Figures 1 and 5) are preferably inclined so as to drain the liquid 37 and/or 37' to a low region beneath the discharge tube 46 and/or 46'. In this region, the bottoms 49 and/or 49' are provided with a concave depression 82 and/or 82' (Figures 1 and 5, respectively) constituting an integral part of the receptacle bottom 49 and/or 49'. This affords the extension of the tube 46 and/or 46' downwardly for projection beyond or beneath the container bottom 49 and/or 49' so that the minutest amount of liquid confined in the concavity 82 or 82' may be dispensed to exclude the possibility of stagnant residues from the liquid 37 and/or 37' or from the cleansing fluid that may be utilized prior to the filling of the containers 25 or 25'. This same container configuration construction may be utilized in all of the embodiments of the invention, since it affords utmost sanitation and total dispensing of the contents confined therein.

It is thus apparent that a very simple, compact and portable dispenser has been provided for liquids such as beer which are only refreshing under constant subjection to pressure in order to preserve the desired taste characteristics therein. The drain receptacle 54 (Figures 1 and 2) is detachably connected for support in association with any one of the embodiments of the invention described supra, and this affords dispensing of liquids over the counter for direct consumption without creating any mess in consequence thereof. Various changes may be made in the embodiment of the invention herein specifically described without departing from or sacrificing any of the advantages of the invention as defined in the appended claims.

I claim:

1. In a portable liquid dispenser, the combination with a metallic housing, of a liquid confining container of smaller dimensions disposed concentrically within said housing, thermal insulation packed between said housing and container, metallic end spacers enclosing said insulation, said housing extending beyond both ends of said container, reinforced edges on said housing ends to afford the support and manipulation of the assembled unit, instrumentalities for selectively effecting the pressure discharge of the liquid from said container, and means for completely enclosing said pressure discharge instrumentalities while said dispenser is in transit or storage.

2. In a portable liquid dispenser, the combination with a metallic housing, of a liquid confining container of smaller dimensions disposed concentrically within said housing, thermal insulation packed between said housing and container, metallic end spacers enclosing said insulation, said housing extending beyond both ends of said container, reinforced edges on said housing ends to afford the support and manipulation of the assembled unit, a faucet in communication with the interior of said container, instrumentalities for selectively effecting the pressure discharge of the liquid through said faucet, and means for completely enclosing said pressure discharge instrumentalities while said dispenser is in transit or storage.

3. In a portable liquid dispenser, the combination with a metallic housing, of a liquid confining container of smaller dimensions disposed concentrically within said housing, thermal insulation packed between said housing and container, metallic end spacers enclosing said insulation, said housing extending beyond both ends of said container, reinforced edges on said housing ends to afford the support and manipulation of the assembled unit, a pivoted faucet in communication with the interior of said container to extend within and beyond the housing edge in its inoperative and operative positions, and means for effecting the pressure discharge of the liquid through said faucet from said container.

4. In a portable liquid dispenser, the combination with a metallic housing, of a liquid confining container of smaller dimensions disposed concentrically within said housing, thermal insulation packed between said housing and container, metallic end spacers enclosing said insulation, said housing extending beyond both ends of said container, reinforced edges on said housing ends to afford the support and manipulation of the assembled unit, a pivoted faucet in communication with the interior of said container to extend within and beyond the housing edge in its inoperative and operative positions, means for effecting the pressure discharge of the liquid through said faucet from said container, and an enclosure detachably associated with said container to conceal said faucet in its inoperative collapsed position.

5. In a portable liquid dispenser, the combination with a metallic housing, of a liquid confining container of smaller dimensions disposed concentrically within said housing, thermal insulation packed between said housing and container, metallic end spacers enclosing said insulation, said housing extending beyond both ends of said container, reinforced edges on said housing ends to afford the support and manipulation of the assembled unit, a pivoted faucet in communication with the interior of said container to extend within and beyond the housing edge in its inoperative and operative positions, means for effecting the pressure discharge of the liquid through said faucet from said container, and a pivoted enclosure detachably associated with said container to conceal said faucet and pressure discharge means in their inoperative collapsed position.

6. In a portable liquid dispenser, the combination with a metallic housing, of a liquid confining container of smaller dimensions disposed concentrically within said housing, metallic end spacers enclosing said insulation, said housing extending beyond both ends of said container, reinforced edges on said housing ends to afford the support and manipulation of the assembled unit, a pivoted faucet in communication with the interior of said container to extend within and beyond the housing edge in its inoperative and operative positions, and a hand pump operatively connected to said container interior to effect the pressure discharge of the liquid through said faucet.

7. In a portable liquid dispenser, the combination with a metallic housing, of a liquid confining container of smaller dimensions disposed concentrically within said housing, metallic end spacers enclosing said insulation, said housing extending beyond both ends of said container, reinforced edges on said housing ends to afford the support and manipulation of the assembled unit, a pivoted faucet in communication with the interior of said container to extend within and beyond the housing edge in its inoperative and operative positions, and a hand pump detachably connected to said container interior to effect the pressure discharge of the liquid through said faucet.

8. In a portable liquid dispenser, the combination with a metallic housing, of a liquid confining container of smaller dimensions disposed concentrically within said housing, metallic end spacers enclosing said insulation, said housing extending beyond both ends of said container, reinforced edges on said housing ends to afford the support and manipulation of the assembled unit, a pivoted faucet in communication with the interior of said container to extend within and beyond the housing edge in its inoperative and operative positions, a hand pump detachably connected to said container interior to effect the pressure discharge of the liquid through said faucet, and a drain receptacle detachably suspended from the top reinforced edges of said housing for supporting a glass in the region of said faucet when displaced to its operative position.

9. In a portable liquid dispenser, the combination with a metallic housing, of a liquid confining container of smaller dimensions disposed concentrically within said housing, metallic end spacers enclosing said insulation, said housing extending beyond both ends of said container, reinforced edges on said housing ends to afford the support and manipulation of the assembled unit, a pivoted faucet in communication with the interior of said container to extend within and beyond the housing edge in its inoperative and operative positions, a tube depending in said container for communication with said faucet, said container having an inclined bottom with a concavity to receive said tube beneath said container bottom, and a hand pump operatively connected to said container interior to effect the pressure discharge of the liquid through said faucet.

CHARLES DOERING.